Dec. 8, 1936. E. T. McCARTHY 2,063,613
HEAT REGULATION FOR BUILDINGS
Filed April 26, 1935  3 Sheets-Sheet 1

Inventor
Elmer T. McCarthy
Attys.

Patented Dec. 8, 1936

2,063,613

UNITED STATES PATENT OFFICE 2,063,613

HEAT REGULATION FOR BUILDINGS

Elmer T. McCarthy, Chicago, Ill., assignor to Klipfel Manufacturing Company, a corporation of Illinois Application April 26, 1935, Serial No. 18,375

17 Claims. (Cl. 236—91)

This invention relates to that class of heat regulation devices which automatically control the delivery of heat to a building according to both inside and outside conditions.

There are at present heating systems which automatically operate to deliver heat to a building in an amount varying inversely to temperatures within and without the building, to compensate for heat losses and thereby maintain a fairly uniform temperature within the building. Temperature responsive devices, through electric switches or pneumatic valves control the operation of burners, dampers, forced draft appliances, or steam valves. There is an expansion element or bellows for operating the switch and such expansion element communicates directly with a plurality of bulbs or expansion fluid containers respectively located outside and inside of a building, and there may be two inside bulbs, one positioned to be influenced by air temperature within the building and another positioned to be influenced directly by the temperature of the heating medium.

The present improvements have to do with the provision of a plurality of expansion means for operating a control switch or pneumatic regulator, each of which expansion devices is connected independently to a bulb filled with a temperature-responsive fluid, and these expansion devices operate the switch or other heat control means through a leverage system, thus enabling the attainment of independent adjustments for increasing or decreasing the relative effectiveness of any one temperature responsive element with reference to the other temperature-responsive elements. The equipment is, therefore, suitable for a wide range of buildings without change of parts thereof to suit the peculiar conditions of any one building.

A further main purpose of the invention is to render the outdoor temperature responsive elements subject to action not only in accordance with outside air temperatures and direct solar radiation but also subject to the heat removing capacity of air in motion.

The purposes of the invention may be attained by use of equipment such as diagrammatically illustrated in Figures 1 and 2 which show the same essential operating elements but differ in the arrangement of levers for operating a control switch.

Figure 1 shows simple levers while

Fig. 4 is a detail bottom plan showing the connection between an expansion bellows and a lever operated thereby; the lever being shown broken away.

Fig. 5 is a detail partly in section of a pneumatic valve which may be used as the control device for a heating system in place of the electric switch shown in Figs. 1 and 2.

The regulation of the temperature within a building by changing the rate of heat delivery may be effected in various ways. If the temperature-responsive devices for controlling the heating system are located solely within a building, over-runs in room temperature both above and below normal are more likely to occur than when the regulating means also includes outdoor temperature responsive elements which respond to changes in outdoor conditions and limit the temperature of heating medium to a degree slightly above that required to maintain a desired room temperature under existing weather conditions. Changes in wind velocity are a decidedly important factor in this connection.

Figure 1:
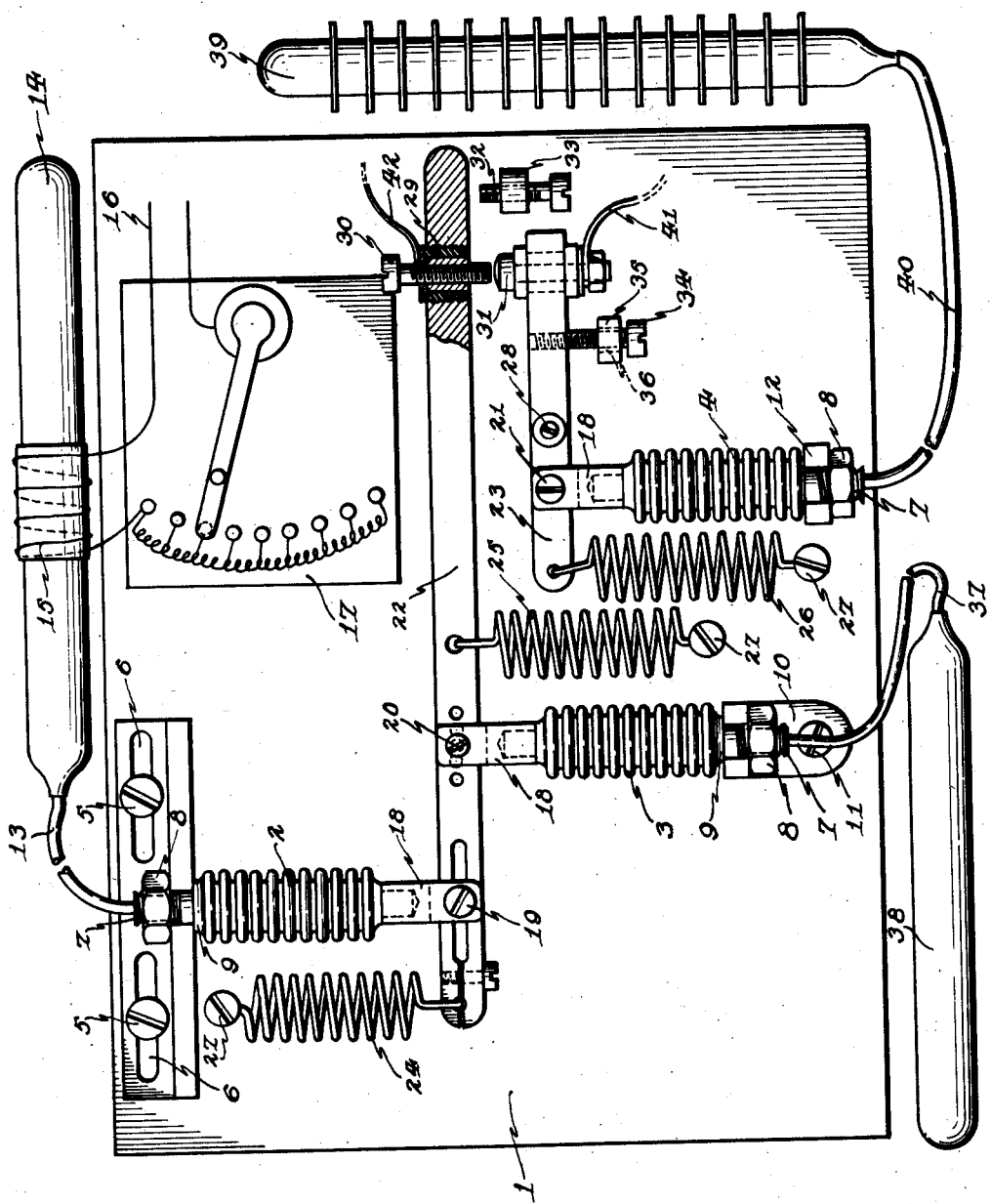

The control means, as illustrated in Fig. 1, includes a panel 1 which supports expansion bellows 2, 3 and 4. The bellows 2 is supported from the flange of a plate which is clamped to panel 1 by screws 5 passing through slots 6 in the plate. The expansion bellows are of standard construction, having at one end a hollow threaded stud 7 which receives a nut 8 bearing against the bellows support and serving to draw the bellows head 9 against such support. These supports are differently constructed in the case of this instrument, the bellows support being shiftable laterally along the screws 5, whereas the bellows support 10 may be adjusted around the center provided by post 11, while the support 12 is fixed.

The bellows 2 communicates through tubing 13 with an outdoor bulb 14. The tubing is sealed to the supporting screw of bellows 2.

The expansion and contraction of the fluid within bulb 14 takes place according to changes in outdoor air temperatures, solar radiation and the effect of an electric heating coil 15 as modified by wind velocity.

The heating coil receives current continuously from supply conductor 16, passing through rheostat 17.

Opposite to the supporting end of each bellows is a movable end 18 which has fulcrum connections 19, 20 or 21 with one of the levers 22 and 23. The fulcrum connections 19 and 20 are shiftable along the lever 22.

The expansion of each bellows 2, 3 and 4 respectively is resisted by a restoring spring 24, 25 or 26. The springs are extended between stationary posts 27 and the levers 22 and 23.

The lever 22 may oscillate around either or both of the fulcrums 19 and 20; while the lever 23 may oscillate around the fixed fulcrum 28.

Lever 22 carries, in an insulating bushing 29, the contact screw 30; while lever 23 carries a similarly mounted coacting contact member 31.

Movement of the levers 22 and 23 toward each other into contacting position is limited by screw 32 in the post 33 on the panel and by screw 34 carried by lever 23 and having a head for engagement with the fixed post 35. The screw 34 passes through a hole 36 in the post 35 which hole is of larger diameter than the shank of the screw. Complete differential regulation between the various temperature responsive elements is afforded by these screws and from the fact that the bellows are shiftable along the contact operating levers.

The bellows 3 is connected through tubing 37 with a bulb 38. This bellows and bulb are also filled with an expansion fluid. Bulb 38 is located so as to be responsive to the temperature of the steam, hot water or other heating medium of the building heating system.

The finned bulb 39 is so located as to have its temperature change with the air in the building being heated and this bulb is connected by tube 40 with bellows 4.

In the operation of the construction shown in Figure 1 a decrease in air temperature within the building results in contraction of the fluid contained within bulb 39 and bellows 4, thereby permitting spring 26 to rock lever 23 around its fulcrum 28 toward circuit closing position for the heat delivery control circuit indicated by the conductors 41 and 42. But the time of contact is hastened more or less dependent upon the action of the expansion fluid in bellows 2 and 3.

In the case of a temperature drop in the heating medium, to which bulb 38 is subject, bellows 3 contracts, being urged in that direction by spring 25, and the right end of lever 22 moves down around the fulcrum 19 and carries the contact screw 30 toward the screw 31. If there is also a drop in outdoor temperature tending to contract the fluid in bulb 14, or the wind velocity increases and thus lowers the temperature of coil 15, the reduction in fluid volume in this bulb and bellows 2 permits the contraction of bellows 2 under the action of spring 24; thus allowing the lever 22 to be rocked further downward around fulcrum 20 and carrying the contact 30 toward the contact 31.

An extreme contraction of any one bellows will thus cause the circuit to be closed and this circuit is so connected as to speed up the operation of the heating system of a building. For example, the interior of a building may be warm; thus the bellows 3 and 4 remain expanded and tend to hold the contacts 30 and 31 apart; but a fall in outside temperature at this time, or an increase in wind velocity which results in greater heat losses from the building, will cause the contraction of bellows 2 and thus permit contacts 30 and 31 to come together under the action of spring 24. The resulting increase in heat delivery to the building accordingly takes place in advance of the apparent effect of the increased rate of heat loss.

Likewise an increase in outdoor temperature, and a fall in wind velocity tend to delay the closing of the control circuit through contacts 30 and 31 upon the contraction of bellows 3 and 4.

Figure 2:
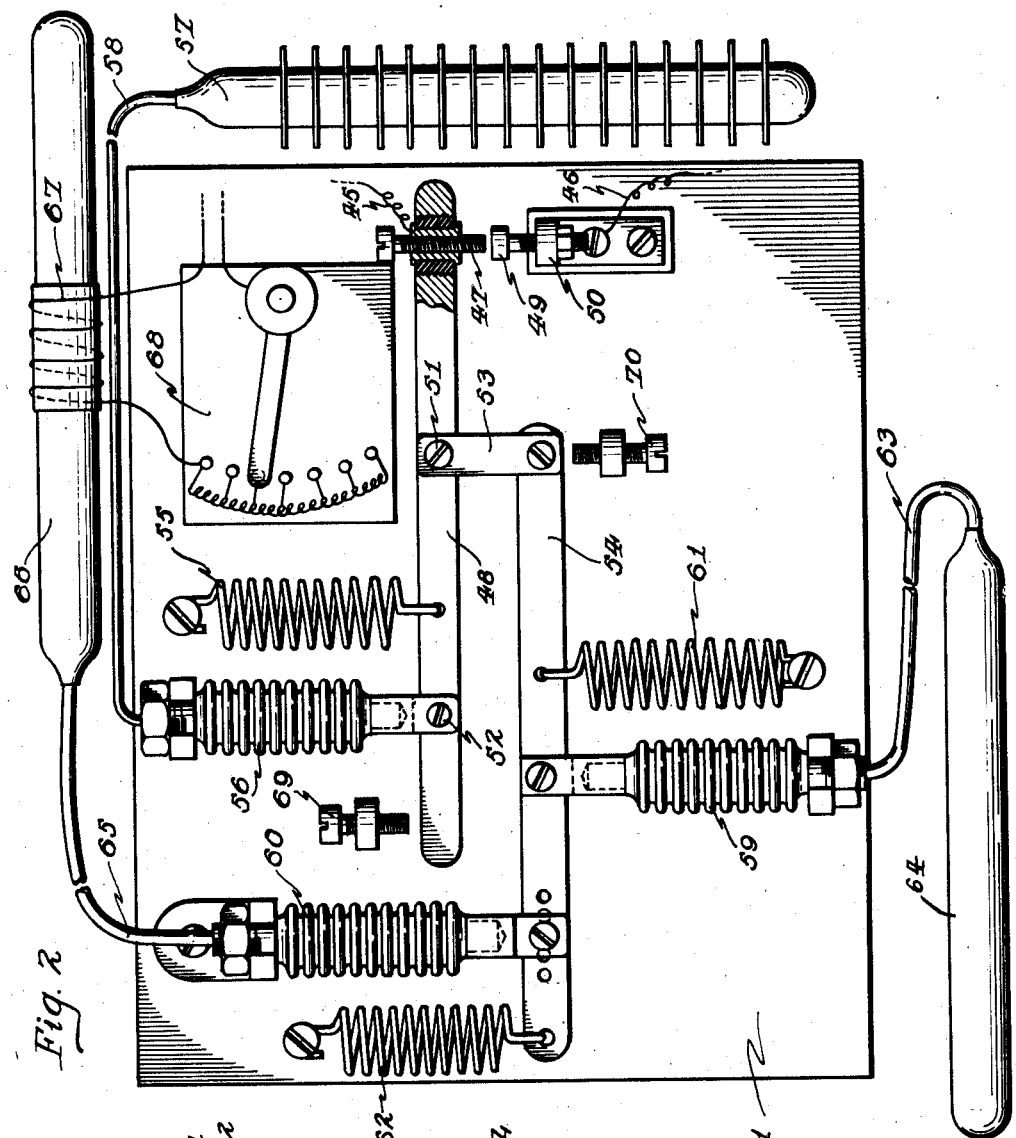
Fig. 2 shows a compound lever arrangement in the control device.

The instrument illustrated by Fig. 2 accomplishes the same purposes as that illustrated by Fig. 1, but the lever connections between the bellows and the control switch are arranged to operate a single contact member to move it toward and away from a stationary contact member. In Fig. 1 both contacts are shown as movable.

The wires 45 and 46 in Fig. 2 lead to furnace control motors or valve or damper operating means which become effective to increase the delivery of heat whenever contact 47 on the end of lever 48 moves into engagement with a contact 49, carried by the fixed post 50 insulated from panel 1. Lever 48 may rock around either or both of fulcrums 51 and 52. A link 53 connects lever 48 with a lever 54.

Lever 48 is rocked around its fulcrum 51 to carry the contact 47 toward contacting position by spring 55 when bellows 56 contracts due to a reduction in the volume of fluid therein and in the room bulb 57 which is connected to the bellows by tube 58. Contraction of either bellows 59 or 60 likewise permits the springs 61 and 62 to act through the lever 54 and link 53 and further move the contact 47 toward contact 49. The bellows 59 connects through a tube 63 with a bulb 64 located to be influenced by the temperature of the heating medium circuit, and the bellows 60 connects through the tube 65 with an outdoor temperature responsive bulb 66, the latter carrying a heating coil 67 similar to the coil 15, Fig. 1, and having the same purpose of artificially applying heat to the outdoor bulb 66 so that the latter may be rendered responsive to the cooling effect of wind independently of temperature changes.

A rheostat 68 affords a convenient means for increasing or decreasing the heating effect of coil 67 and also for cutting out the coil in case it is desired to advance the closing of contacts 47 and 49 so as to raise the room temperature.

Fig. 5 shows the lever 48 as carrying a valve 71 instead of an electric contact. This valve controls a bleed port 72 of pneumatic means leading to diaphragm valves or other control means for a heating system.

Figure 3:
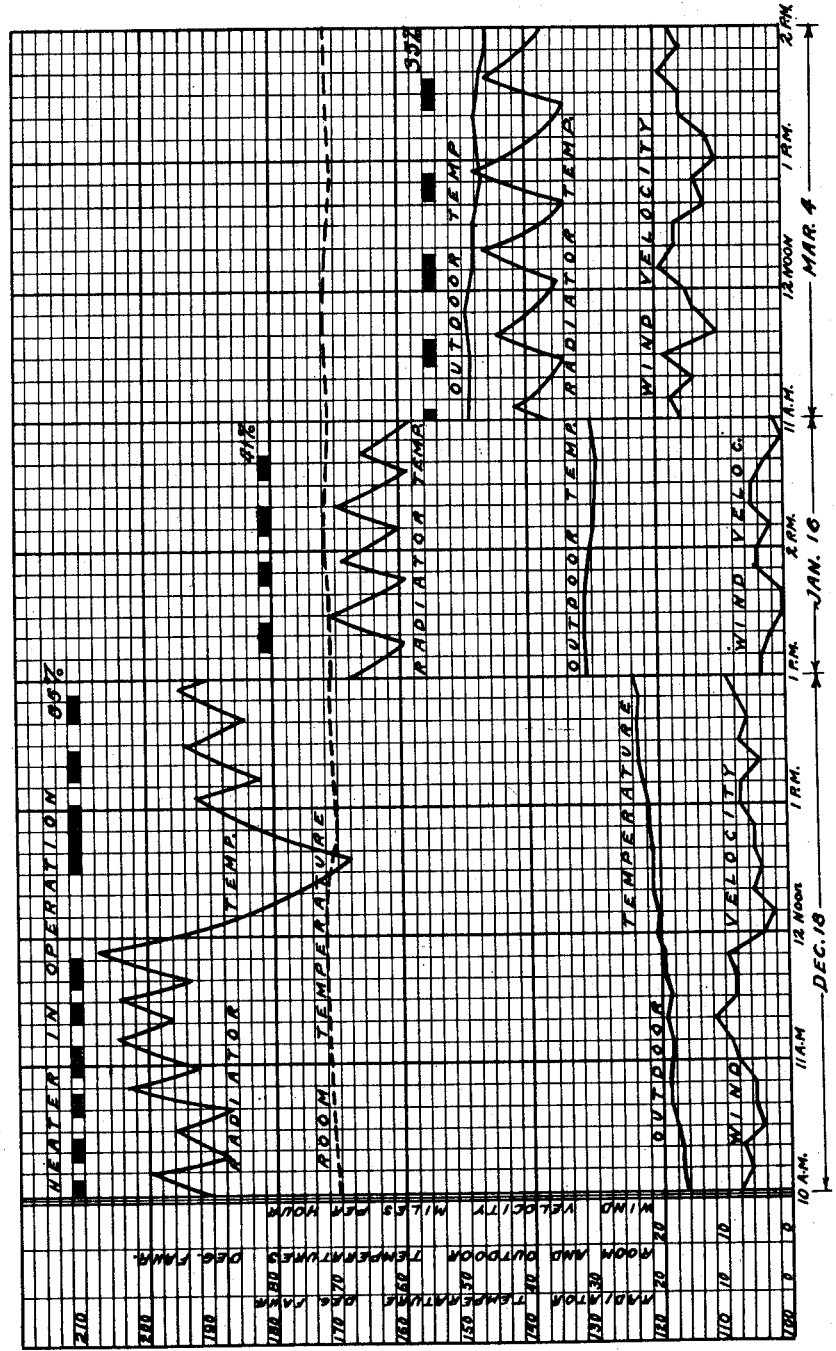
Fig. 3 is a chart intended to illustrate the effect of the heat regulator on a heating system in accordance with indoor and outdoor temperature variations and changes in wind velocity.

The chart shown in Fig. 3 indicates examples of the time intervals and percentage of time that a heating plant may be in operation on certain days as controlled by the multiple expansion element arrangements shown in Figs. 1 and 2, for example if the circuit of conductors 41 and 42, Fig. 1 controls the stoker of a steam heating system, the stoker is in operation according to the cross-hatch indications and the radiator temperatures rise and fall as indicated in the chart while the room temperature remains fairly constant.

The operation of the stoker is dependent upon the combined effect of variations in room temperature, radiator temperature, outdoor temperatures and wind velocity.

To provide a margin of heating capacity and so insure adequate heating under adverse conditions such as excessive cold air infiltration in windy weather, heat regulating devices of this character are adjusted to limit the heating medium temperature to a degree somewhat above that ordinarily required to maintain a desired room temperature for a given outdoor temperature condition. If the heating medium is maintained at such slightly higher temperature, the room temperature will in time rise above the desired normal, unless some means is incorporated in the control device to decrease the supply of heat whenever the room is above normal temperature. One form of such means is shown by stop screw 32 in Fig. 1 which is intended to be adjusted so as to stop lever 22 and contact 30 and thus prevent contact being made when 31 is in a position corresponding to a higher than normal room temperature. Stop screw 70 serves the same purpose in Fig. 2. Consequently the supply of heat is diminished when for any reason the room temperature is above normal, regardless of whether the heating medium has attained its normal temperature corresponding to existing weather conditions.

On the other hand it is not desirable to fix this upper limit of heating medium temperature solely with reference to weather conditions without regard to room temperature as do some heat control devices of this general character as this prolongs unduly the time required to heat up after the room temperature has been allowed to drop considerably for any reason. Under such conditions time is saved by permitting the heating medium temperature to rise in excess of normal. With the control mechanism shown as Fig. 1, the amount of such excess will vary directly with the deficiency of room temperature up to a certain safe limit determined by the adjustment of stop screw 34.

Screw 34 is ordinarily adjusted so that its head will strike post 35 when bellows 4 has contracted to a length corresponding to about 55° F. room temperature. In this way the maximum upper position of contact 31 is fixed and this in turn determines the maximum temperature ever required at heating medium bulb 38, with given outdoor conditions, to break the circuit between 30 and 31 even when the room temperature is lower than 55° F. Soon after the circuit is broken the heating medium temperature begins to drop and the room temperature rises. In a short time, due to the rapid cooling of heating medium, contact will again be made between 30 and 31 and another increase in heating medium temperature will occur.

After the room temperature has risen to 55° F. there will be a progressive downward movement of contact 31 and with each succeeding cycle of operation the heating medium temperature required to break the circuit will be lowered. By the time the room has attained normal temperature the heating medium temperature will have dropped to its normal value for existing weather conditions and no over-run in room temperature will result. A material reduction in time required to attain normal room temperature is thus effected without an unduly high temperature of heating medium.

Stop screw 69 serves the same purpose in Fig. 2 as screw 34 in Fig. 1. Without stop 34 or equivalent means the temperature of heating medium would rise abnormally, probably dangerously high when the room temperature is much below normal.

I claim:

1. Thermostatic control means for heating systems comprising an operating lever system and a plurality of expansion elements having connections with said lever system for setting it differentially in accordance with differential operations of said expansion elements, a bulb containing an expansible fluid for each of said expansion elements and having a tubular connection with its respective expansion element and means for rendering one of said expansion elements ineffective for controlling the supply of heat to the space to be heated when the temperature in said space is above a desired normal value.

2. Thermostatic control means for heating systems comprising an operating lever system and a plurality of expansion elements having connections with said lever system for setting it differentially in accordance with differential operations of said expansion elements, a bulb containing an expansible fluid for each of said expansion elements and having a tubular connection with its respective expansion element, and electric heating means associated with one of said bulbs, and means for rendering one of said expansion elements ineffective for controlling the supply of heat to the space to be heated when the temperature in said space is above a desired normal value.

3. Thermostatic control means for heating systems comprising an operating lever system and a plurality of expansion elements having connections with said lever system for setting it differentially in accordance with differential operations of said expansion elements, a bulb containing an expansible fluid for each of said expansion elements and having a tubular connection with its respective expansion element, and means for rendering one of said expansion elements ineffective for controlling the supply of heat to the space to be heated when the temperature in said space is below a predetermined minimum value.

4. Thermostatic control means for heating systems comprising an operating lever system and a plurality of expansion elements having connections with said lever system for setting it differentially in accordance with differential operations of said expansion elements, a bulb containing an expansible fluid for each of said expansion elements and having a tubular connection with its respective expansion element, and electric heating means associated with one of said bulbs, and means for rendering one of said expansion elements ineffective for controlling the supply of heat to the space to be heated, when the temperature in said space is below a predetermined minimum value.

5. Thermostatic control means for heating systems comprising an operating lever system and a plurality of expansion elements having connections with said lever system for setting it differentially in accordance with differential operations of said expansion elements, a bulb containing an expansible fluid for each of said expansion elements and having a tubular connection with its respective expansion element, means for rendering one of said expansion elements ineffective for controlling the supply of heat to the space to be heated when the temperature in said space is above a desired normal value, and means for rendering one of said expansion elements ineffective for controlling the supply of heat to said space when the temperature therein is below a predetermined minimum value.

6. Thermostatic control means for heating systems comprising an operating lever system and a plurality of expansion elements having connections with said lever system for setting it differentially in accordance with differential operations for said expansion elements, a bulb containing an expansible fluid for each of said expansion elements and having a tubular connection with its respective expansion element, and electric heating means associated with one of said bulbs, means for rendering one of said expansion elements ineffective for controlling the supply of heat to the space to be heated when the temperature in said space is above a desired normal value, and means for rendering one of said expansion elements ineffective for controlling the supply of heat to said space when the temperature therein is below a predetermined minimum value.

7. Thermostatic control means for heating systems comprising an operating lever system and a plurality of temperature responsive elements having connections with said lever system for setting it in accordance with existing outdoor, heating medium, and room temperatures, and means for rendering one of said temperature responsive elements ineffective for controlling the supply of heat to the space to be heated when the temperature in said space is above a desired normal value.

8. Thermostatic control means for heating systems comprising an operating lever system and a plurality of temperature responsive elements having connections with said lever systems for setting it in accordance with existing outdoor, heating medium, and room temperatures, and electric heating means associated with one of said temperature responsive elements, and means for rendering one of said temperature responsive elements ineffective for controlling the supply of heat to the space to be heated when the temperature in said space is above a desired normal value.

9. Thermostatic control means for heating systems comprising an operating lever system and a plurality of temperature responsive elements having connections with said lever system for setting it in accordance with existing outdoor, heating medium, and room temperatures, and means for rendering one of said temperature responsive elements ineffective for controlling the supply of heat to the space to be heated when the temperature in said space is below a predetermined minimum value.

10. Thermostatic control means for heating systems comprising an operating lever system and a plurality of temperature responsive elements having connections with said lever system for setting it in accordance with existing outdoor, heating medium, and room temperatures, electric heating means associated with one of said temperature responsive elements, and means for rendering one of said temperature responsive elements ineffective for controlling the supply of heat to the space to be heated when the temperature in said space is below a predetermined minimum value.

11. Thermostatic control means for heating systems comprising an operating lever system and a plurality of temperature responsive elements having connections with said lever system for setting it in accordance with existing outdoor, heating medium, and room temperatures; means for rendering one of said temperature responsive elements ineffective for controlling the supply of heat to the space to be heated when the temperature in said space is above a desired normal value, and means for rendering one of said temperature responsive elements ineffective for controlling the supply of heat to said space when the temperature therein is below a predetermined minimum value.

12. Thermostatic control means for heating systems comprising an operating lever system and a plurality of temperature responsive elements having connections with said lever system for setting it in accordance with existing outdoor, heating medium, and room temperatures, electric heating means associated with one of said temperature responsive elements, means for rendering one of said temperature responsive elements ineffective for controlling the supply of heat to the space to be heated when the temperature in said space is above a desired normal value, and means for rendering one of said temperature responsive elements ineffective for controlling the supply of heat to said space when the temperature therein is below a predetermined minimum value.

13. Thermostatic control means for heating systems comprising a plurality of interconnected elements responsive respectively to outdoor, heating medium, and room temperatures, means for rendering one of said temperature responsive elements ineffective for controlling the supply of heat to the space to be heated when the temperature therein is above a desired normal value, and means for rendering one of said elements ineffective for controlling the supply of heat to said space when the temperature therein is below a predetermined minimum value.

14. Thermostatic control means for heating systems comprising a plurality of interconnected elements responsive respectively to outdoor, heating medium, and room temperatures; electric heating means associated with one of said temperature responsive elements; and means for rendering ineffective one of said elements for controlling the supply of heat to the space to be heated when the temperature in said space is above a desired normal value.

15. Thermostatic control means for heating systems comprising a plurality of interconnected elements responsive respectively to outdoor, heating medium, and room temperatures, electric heating means associated with one of said temperature responsive elements; and means for rendering ineffective one of said elements for controlling the supply of heat to the space to be heated when the temperature therein is below a predetermined minimum value.

16. Thermostatic control means for heating systems comprising a plurality of interconnected elements responsive respectively to outdoor, heating medium, and room temperatures; electric heating means associated with one of said temperature responsive elements; means for rendering one of said elements ineffective for controlling the supply of heat to the space to be heated when the temperature therein is above a desired normal value, and means for rendering one of said elements ineffective for controlling the supply of heat to the space to be heated when the temperature therein is below a predetermined minimum value.

17. Thermostatic control means for heating systems, comprising an operating lever system, a plurality of expansion elements having connections with said lever system for setting the lever system differentially in accordance with differential operations of said expansion elements; a bulb containing an expansible fluid for each of said expansion elements and having a tubular connection with its respective expansion element, means for altering between said expansion elements the lever ratio of said lever system, one of said bulbs being located outdoors to be wind responsive, an electric heating element for said bulb located outdoors, and a circuit for said bulb including a variable resistance element.

ELMER T. McCARTHY.